(12) United States Patent
Ta et al.

(10) Patent No.: US 6,272,184 B1
(45) Date of Patent: *Aug. 7, 2001

(54) NON-COHERENT FREQUENCY SHIFT KEYING DETECTION SCHEME

(75) Inventors: Jonathan H. Ta, Irvine; Samuel T. Wong, Rowland Heights; Stanley C. Hsieh, Diamond Bar; Sandeep Rajpal, Irvine, all of CA (US)

(73) Assignee: Conexant Systems, Inc., Newport Beach, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/992,034

(22) Filed: Dec. 17, 1997

(51) Int. Cl.[7] .............................. H03D 3/00; H04L 27/14
(52) U.S. Cl. ........................ 375/334; 329/300; 379/142; 704/213
(58) Field of Search ..................... 375/328, 334, 375/335, 336, 337, 346, 350; 379/93.02, 93.03, 142; 329/300, 303; 380/3; 704/205, 213

(56) References Cited

U.S. PATENT DOCUMENTS

| | | | |
|---|---|---|---|
| 3,879,665 | * 4/1975 | Carlow et al. | 375/328 |
| 4,706,282 | * 11/1987 | Knowd | 380/3 |
| 4,706,293 | * 11/1987 | Knowd | 704/213 |
| 5,311,556 | * 5/1994 | Baker | 375/334 |
| 5,661,769 | * 8/1997 | Tulai | 375/334 |

OTHER PUBLICATIONS

Siemens, ICs for Communications—User's Manual 04.97, 1997.

* cited by examiner

*Primary Examiner*—Stephen Chin
*Assistant Examiner*—Chieh M. Fan
(74) *Attorney, Agent, or Firm*—Snell & Wilmer

(57) ABSTRACT

A non-coherent frequency shift keying detection scheme. The invention has been applied to the special case of capturing caller ID information when the voice-band modem is in the low power mode. The technique provides the capability for capturing and decoding enough of the caller ID information transmitted by the telephone company while the computer is in the sleep or low power mode, and upon awakening the computer can use this captured information to decode the actual caller ID information. Additionally, this invention automatically accommodates both the Bell 202 or V.23 transmission standards by utilizing a threshold concept in which the time that has elapsed between the zero crossings of an FSK tone half cycle are measured. The elapsed times may be used as an indication of which FSK tone has been transmitted thus allowing capture of caller ID information. The bit output of the caller ID capture circuit is output for storage by RAM thus allowing use by the computer when it wakes up.

19 Claims, 3 Drawing Sheets

```
% Sampled Output (Signal 41 from Sampling Circuit 40 in Figure 1)
% Rectified Output (Signal 31 in Figure 1) is sampled at sampling rate (i.e. 38.4kHz)
% Signal 31 coming out of the Threshold Detector Circuit 30 in Figure 1

SampledOut((1:numticks)=RectifiedOut(((1:numticks)*samppersymbolitickerspersymbol);

% Demodulate FSK
% Method: Timing recovery using delay measurement method
% Demodulate using number of zero crossings sample=SampledOut(1);
prestate=0;
state=0;
Max_TickThresh=28;              % Threshold to set ZC_flag, if above then signal silence
ZC_flag=0;                      % Zero Crossing flag, checks to see if zero crossings occur
ZCcounter=0;                    % Ticks between zero-crossings
statecounter=0;                 % Ticks between state changes
sampleclock=1;                  % Sample clock for i=1:NumSymbols
    statecounter=0;
    while (statecounter<tickerspersymbol)&(sampleclock<NumSymbols*tickspersymbol)
        if (xor(prevsample,SampledOut(sampleclock)))
            ZC_flag=1;                                  % if zero-crossing
            prevsample=SampledOut(sampleclock);         % ZC_flag set high if zero crossing occurs
            state=(ZCounter>=TickThresh);               % Check the number of ticks between ZCs
            ZCcounter=0;
        end
        counter=ZCcounter+1;
            Ccounter>=TickThresh)                       % TickThresh is programmable
            state=1;
        end if (ZCounter>Max_TickThresh)                    % Sets flag to zero if counter
            ZC_flag=0;                                  %   goes above this threshold statecounter=statecounter+1;                    % increment state counter
```

FIG.2A

```
if (xor(prevstate, state))                    % if state-change
    prevstate=state;
    if (statecounter<=tickspersymbol/2)       % if state change occurs in first half of baud
        statecounter=statecounter-1;          % decrement counter
    else                                      % if state change occurs in second half of baud
        statecounter=statecounter+1;    % increment counter
    end
end
sampleclock=sampleclock+1;

if (statecounter==tickspersymbol/2)           % Outputs to BitOut at the center of the baud
    BitOut(i)=and(state,ZC_flag);             % BitOut always equal to zero if ZC_flag
    end                                       % equal to zero. Means, BitOut is zero
  end                                         % during silence.
end
```

FIG.2B

NON-COHERENT FREQUENCY SHIFT KEYING DETECTION SCHEME

FIELD OF THE INVENTION

The present invention relates to the field of non-coherent frequency shift keying (FSK) detection. Specifically, the invention has been applied to a voice band modem sub-circuit that captures the caller identification information, henceforth referred to as caller ID, while the computer is in low power mode.

BACKGROUND OF THE INVENTION

Modern digital communications typically require a means by which digital information is transmitted over an analog channel such as a telephone line frequency shift keying, or FSK, is one such method that has been commonly used in many communication protocols due to its simplicity and ease of implementation. In FSK, bits, or sequences of bits, are represented by signals of different frequencies. Non-coherent techniques for doing frequency shift keying detection are well known and can be found in any standard text on digital communications. The fundamental problem with these techniques is that they rely on complex filters and a heavy computational load to acquire the required estimates of the frequencies being transmitted. In applications where the power of the device and computational capacity need to be restricted, standard techniques of doing non-coherent detection do not work. An example would be non-coherent FSK detection in wireless communications, where the power requirements to operate a device are extremely restricted. Another example would be caller ID detection on a voice band modem, when the voice-band modem is operating in the low power mode. As such, there is a need for a technique which would allow one to do non-coherent FSK detection with minimal computational and power load.

To illustrate the principles associated with the invention, we shall select the problem of doing caller ID detection on a voice-band modem, when the modem is operating in the low power mode. Personal computer systems today are commonly equipped with a modem device that will allow data and fax communications via a standard telephone line. Current modem technology supports the ability to accept standard incoming calls and subsequently decode and display the caller ID information, if it is being transmitted by the telephone company. However, for this to work properly, the computer and hence the modem is required to be completely powered up (commonly referred to as being "awake") in order for the caller ID information to be captured and displayed. Most computers now have, or in the future will be built with, a power saving "sleep mode". While in this sleep mode, the computer modem will also be in a reduced energy consumption mode receiving only minimal power from a small auxiliary power supply. In most countries the caller ID data is transmitted by the telephone company only once at the start of the incoming call and in addition for some countries the recipient of the incoming call must declare an ability to receive the caller ID information before it can be transmitted by the telephone company. This usually leads to an extremely tight time schedule during which the modem must capture the caller ID information. If the modem is in the "sleep" mode, it usually takes more than two rings to switch from the "sleep" mode to the full power mode. This wake up time requirement does not allow the modem to respond to the telephone company in time, and as such the modem misses the caller ID information. For example, in United States, the caller ID information is transmitted only once by the telephone company between the first and second ring of the incoming telephone call, and the modem, if it is in the low power mode, will miss this information since the "wake up" time requirement is at least two rings for the modem.

Therefore, there exists a need to design a small additional circuit for the computer modem, capable of functioning on the very limited amount of power available from the auxiliary power supply; and with that limited amount of power, be capable of capturing the caller ID which can be processed and displayed by the modem when it "wakes up". The present invention provides an efficient, low-cost, effective solution to the above problem. These and other advantages of the present invention not specifically mentioned above will become clear within discussions of the present invention presented herein.

SUMMARY OF THE INVENTION

The present invention describes a technique of doing non-coherent FSK detection with minimal computational and power load. To illustrate the general principles associated with the invention, the invention has been applied to the problem of doing caller ID detection in a voice-band modem with minimal computational and power load. Since, the caller ID transmission protocol uses two frequencies to transmit the required information, the problem reduces to a case of doing binary non-coherent FSK detection.

A caller ID capture circuit is described herein for a system which captures the caller ID information being transmitted by the telephone company when the computer is in a low power mode. Upon awakening, the computer can use this captured information to decode and display the actual caller ID. Furthermore, the present invention provides a capability to accommodate a variety of caller ID transmission protocols that utilize binary frequency shift keying transmission. Specifically, the present invention automatically accommodates both Bell 202 and V.23 caller ID transmission protocols by utilizing a threshold design in which the time intervals between the zero crossings (zero level amplitudes) of an FSK tone half cycle are measured. This elapsed time is used as an indication of which FSK tone has been received. If the elapsed time between zero crossings is greater than a certain threshold, a decision is made that the lower frequency was transmitted. Otherwise, the decision is made that the higher frequency was transmitted. The higher frequencies correspond to a binary zero, and the lower frequency correspond to a binary one.

The main embodiment of the present invention consists of a caller ID capture circuit used for capturing the incoming caller ID data which is subsequently processed by the modem when it wakes up. This caller ID signal (conforming to either Bell 202 or V.23 modem transmission protocol standards for caller ID in the United States) consists of caller ID information encoded and transmitted via binary frequency shift keying (FSK). The caller ID capture circuit can be designed using simple digital logic circuitry which may include standard logic blocks and components like AND, OR, EXCLUSIVE OR gates and simple up-down counters. In the current preferred embodiment, a caller ID detector circuit is coupled to receive an incoming telephone call, detect the transmission of caller ID information from the telephone company and thereupon initiate the operation of the caller ID capture circuit. A threshold detector circuit is coupled to the caller ID detector circuit and rectifies the incoming analog FSK caller ID data signal into voltage levels corresponding to digital binary values. Next, a sampling circuit is coupled to the threshold detector circuit in order to sample the rectified FSK caller ID data signal and provide one bit digital samples of the binary FSK caller ID signal. The sampling frequency is chosen to be substantially higher, preferably 30–50 times higher than the frequency shift keying symbol rate used to transmit the caller ID information. A zero crossing detector circuit receives the sampled signal from the sampling circuit and outputs a zero crossing event signal. Thereupon, a zero crossing counter circuit measures the time duration between the zero crossing event signals in units of number of clock cycles of the sampling clock. Based on the time duration between the zero crossing event signals, a decision is taken on the value of the current binary FSK signal and a state variable circuit stores the currently detected binary FSK symbol. An output circuit is coupled to the state variable circuit which outputs the value of the state variable to RAM for storage at symbol intervals. The symbol intervals are calculated based upon the output value of the state counter circuit, as described below. The state counter circuit stores the number of clock cycles in a received baud. The counter self-adjusts in response to input from the state variable circuit in order for the output circuit to output the binary caller ID data close to the center of the baud. This is done by aligning the occurrences of the zero crossing counter resets as close as possible to the transitions of the output of the state variable circuit. The modem upon awakening retrieves the caller ID data from RAM for decoding and displays it on the computer screen.

BRIEF DESCRIPTION OF THE DRAWINGS

FIGS. 2A and 2B is the algorithm for the state counter circuit, state variable circuit, output circuit, zero crossing detector circuit, and zero crossing counter circuit in which the binary FSK caller ID signal is sampled, the zero crossings are measured, and the timing recovery is performed.

DETAILED DESCRIPTION OF THE INVENTION

Figure 1:
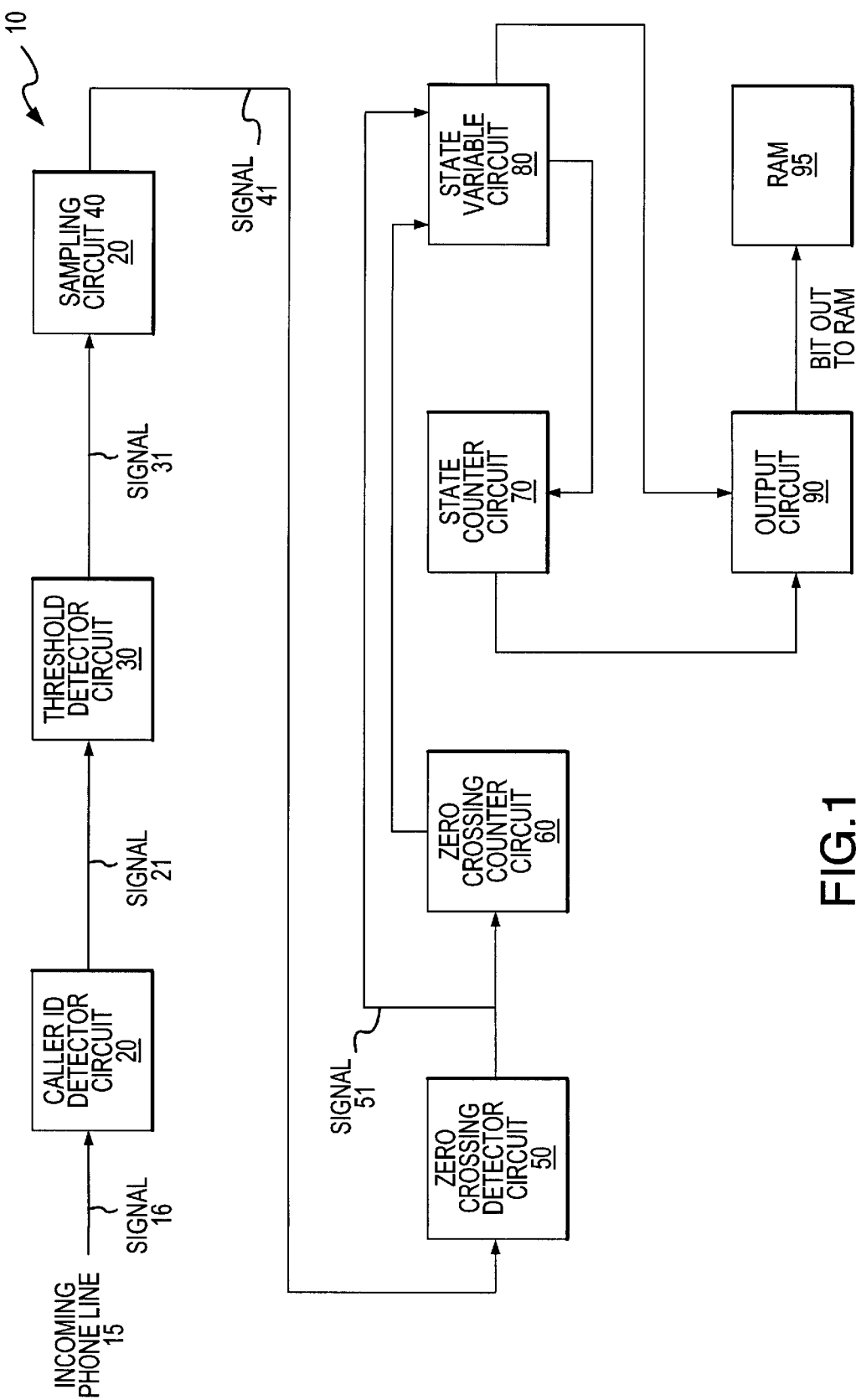
FIG. 1 is a functional block diagram of a binary non-coherent frequency shift keying detection scheme for capturing caller-id information.

Non-coherent techniques for doing frequency shift keying detection are well known and can be found in any standard text on digital communications. The fundamental problem with these techniques is that they rely on complex filters and a heavy computational load to get the required estimates of the frequencies being transmitted. In applications where the power of the device and computational capacity need to restricted, standard techniques of doing non-coherent detection do not work. An example would be non-coherent FSK detection in wireless communications, where the power required to operate a device is extremely restricted. Another example would be caller ID detection on a voice band modem, when the voice-band modem is operating in the low power mode. As such, there is a need for a technique which would allow one to do non-coherent FSK detection with minimal computational and power load.

To illustrate the principles associated with the invention, the problem of performing caller ID detection on a voice-band modem, when the modem is operating in the low power mode is described. Since, the caller ID transmission protocol uses two frequencies to transmit the required information, the problem reduces to a case of doing binary non-coherent FSK detection.

The following gives a detailed description of the present invention relating to a binary non-coherent frequency shift keying scheme for caller ID detection. Numerous specific details are set forth in order to provide a thorough understanding of the present invention. Note, that even though the concepts are illustrated using a binary FSK scheme, it will be recognized by one skilled in the art, that the same principles can very easily be extended to the problem of doing M-ary non-coherent FSK detection. Also, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Binary Non-Coherent Frequency Shift Keying Detection Scheme

With reference to FIG. 1, a functional block diagram of the binary non-coherent frequency shift keying detection scheme (hereinafter system 10) is shown. The system 10 allows for the capturing of caller ID information contained within the signal of an incoming telephone call 16. The incoming phone line 15 is coupled to the caller ID detector circuit 20. The caller ID detector circuit 20 upon detection of the caller ID turns on the remaining circuits of the system 10. The system 10 is designed to accommodate any caller ID standard that uses binary FSK as its form of modulation. For the United States, the caller ID information can be transmitted based on either Bell 202 or V.23 standards. As is well known, these standards use two different tones to represent a binary one and a binary zero. The Bell 202 standard uses a 1200 hertz tone for a binary one and a 2200 hertz tone for a binary zero. The V.23 standard uses a 1300 hertz tone for a binary one, and a 2100 hertz tone for a binary zero.

The caller ID detector circuit 20 is coupled to a threshold detector circuit. The threshold detector circuit 30 sets a predetermined voltage threshold which results in a rectified caller ID signal 31. This threshold detector circuit 30 rectifies the incoming analog signal to a voltage level corresponding to a digital one or zero wherein, the corresponding analog signal has a positive amplitude or negative amplitude respectively. The sampling circuit 40 receives the start signal from the caller ID detector circuit 20 and begins to read the incoming information contained within the rectified caller ID signal 31. The present embodiment of the invention samples the caller ID signal at a rate of 38.4 kilohertz. This sampling rate may be adjusted higher to increase the immunity of the algorithm to gaussian noise or other distortion effects caused by communication channels. The sampling rate is chosen to be an integer multiple of the FSK symbol rate, (wherein the FSK symbol rate is the rate at which the binary ones and zeroes which form the caller ID signal are transmitted over the telephone line). This integer multiple is the number of samples per symbol. The sampled output 41 of the sampling circuit 40 is a one bit quantization of the rectified caller ID signal 31. A digital one is outputted at the sampling instances where the received analog signal has a positive amplitude, and conversely, a digital zero is outputted at the sampling instances where the received analog signal has a negative amplitude. This series of ones or zeros (signal 41) is output to the zero crossing detector circuit 50 to which the sampling circuit 40 is coupled.

The zero crossing detector circuit 50 reads the incoming series of ones and zeros (signal 41) from the sampling circuit 40. When a change is detected from a series of ones to a series of zeros or from a series of zeros to a series of ones, the zero crossing detector circuit 50 outputs a zero crossing event signal 51 in the form of a short duration pulse. As the incoming caller ID signal received on the phone line 15 shifts between the lower frequency (1200 Hz for a binary one data bit in the US systems) and the higher frequency (2200 Hz for a binary zero data bit in the US systems), the zero crossing detector circuit 50 event signals 51 will have a longer interval between them corresponding to the lower frequency or a shorter interval corresponding to the higher frequency. This is a central idea to the present invention in that the caller ID information can be captured without the use of power-consuming signal processing methods. The modem need not use its digital signal processor under this limited energy consumption environment. The zero crossing detector circuit 50 is coupled to the zero crossing counter circuit 60.

The zero crossing counter circuit 60 represents the time interval since the last zero crossing event signal 51 in units of the number of sampling clock cycles. The sampling clock is the same clock that was used in sampling circuit 40. The counter resets to zero at each zero crossing event signal 51 and commences counting until the next zero crossing event signal 51. Since it is known how many clock cycles should exist between zero crossing event signals 51 for either the high or low frequency FSK tones, it is possible to determine whether a data bit one or zero has been detected based on the output value of the zero crossing counter circuit 60. Under the US caller ID standard and assuming a 38.4 kHz clock frequency, the lower frequency at 1200 Hz will have on the average of 16 clock cycles, or ticks, between each zero crossing. The higher frequency at 2200 Hz will have an average of 8.727 clock cycles, or ticks, between each zero crossing. Maximum likelihood detection tells us that under a white gaussian noise environment, an integer counter threshold may be set at 12 for optimal decisions. If it is known that the zero crossing counter circuit 60 value has reached the threshold of 12 without a zero crossing event signal 51, then a decision is made that the lower frequency has been transmitted. As such, the state variable circuit 80, which is coupled to the zero crossing counter circuit 60, outputs a one value. The output of the state variable circuit 80 represents the currently detected data bit. If a zero crossing event occurs and the value of the zero crossing counter circuit 60 is less than the threshold of 12, then a decision is made that the higher frequency has been transmitted and the state variable circuit 80 outputs a zero value. To summarize, The value of the state variable circuit 80 will equal zero
  if the zero crossing detector circuit 50
    has output a zero crossing event signal 51
  and, the zero crossing counter circuit 60
    is less than its threshold count, (12 in the present embodiment).
The value of the state variable circuit 80 will equal one
  if the zero crossing detector circuit 50
    has output a zero crossing event signal 51
  and, if the zero crossing counter circuit 60
    is greater than its threshold count, (12 in the present embodiment).

The output of the state counter circuit 70 represents the best estimate of the duration of time since the beginning of the detected baud. The output circuit 90 uses the output of the state counter circuit 70 to output the correct bit to RAM 95 at the time instants selected by the state counter circuit 70. These time instants are the optimal sampling instances. The optimal time to read the value of the state variable circuit 80 is at the center instance in time of the received baud. Under the US caller ID standard of 1200 BPS data rate and a sampling clock frequency of 38.4 kHz, the duration of a baud is 32 clock cycles. The value of the state variable circuit 80 is outputted to RAM 95 when the count of the state counter circuit 70 reaches half of 32, or 16.

The output of the state counter circuit 70 as mentioned earlier represents the best estimate of the time duration since the beginning of the detected baud. The state counter circuit 70 increments by one during each clock cycle. The state counter circuit 70 is reset to zero whenever the count reaches the number of clock cycles per symbol. Under the current embodiment, this value is equal to 32. Since the state counter circuit 70 represents the timing reference which is used for outputting the data bits at optimal instances of time, it is critical that its resets are aligned as closely as possible to the baud transitions. Thus, it must perform self-alignment to best match the duration of the baud. In addition, it is essential that its adjustments be slow-varying in time for best immunity to impulse noise events. Its alignment procedure consists of moving the time of the counter resets closer to the edges of the state changes (i.e. a change in the value of the state variable circuit 80 from a zero to one or vice-versa) occurring within the state variable circuit 80. The state counter circuit 70 will speed up or slow down by incrementing the count by a value of one or decrementing the count by a value of one during the clock cycle every time a transition of the state variable occurs. At the time of a transition of the state variable circuit 80, the algorithm determines if the counter alignment is leading or lagging the edge of the baud. For example, if the current value of the state counter circuit 70 is greater than 16 but less than 32, the number of clock cycles per baud, then it is determined that the counter is lagging and the counter is sped up by incrementing an additional count during that clock cycle. Likewise, the counter is decremented by one during the clock cycle if the state counter value is greater than 0 but less than 16. If no transition in the state variable circuit 80 occurs and the state counter circuit 70 is not reset, the counter increments by one on the clock cycle as normal. To summarize this procedure, the following algorithm is followed after the initial increment:

If the value of state counter circuit 70 has reached 32,
  then state counter circuit 70 is reset.
else
  if a transition of the state variable circuit 80 occurs,
    then
      if the state counter circuit 70 value is greater than 16 but less than 32,
        then the state counter circuit 70 is incremented by 1.
      else
        then the state counter circuit 70 is decremented by 1.

This slow alignment of the state counter circuit 70 minimizes the timing jitter. In addition, a burst of impulsive noise, which may produce erroneous zero crossings, will not drastically damage the timing alignment. The alignment of the state counter circuit 70 corrects for the fact that the start of the state counter circuit 70 may not be aligned to the start of the baud interval and thus the sampling of the bit out to RAM 95 may not actually occur at the optimal center of each baud. The actual algorithm 200 for the state variable circuit 80, the state counter circuit 70, and the zero crossing counter circuit 60 to perform the timing recovery is shown in FIG. 2.

The bit values stored to the RAM 95 are used by the computer when it wakes up to decode the actual caller ID information in accordance with the transmission protocol and is displayed on the computer screen.

Note, that even though the above main embodiment has been described with special reference to Bell 202, the same description would apply to V.23 also. In fact, the threshold of 12 which is chosen for Bell 202 would also work fine if V.23 was used, since the threshold value if calculated for V.23 in a manner similar to that described above for Bell 202 would turn out very close to 12.

Also, note that the above embodiment has been described with special reference to the U.S. caller ID protocols. Other countries like Japan use a caller ID protocol which is very similar to the U.S. standard but with certain small changes. These changes control how the telephone company requires the caller ID detection equipment to respond prior to sending the caller ID information. These changes would involve changing the caller ID detection circuitry 20 to conform to the needs of the transmission protocol. Once the protocol has been established and the handshaking between the telephone company and the caller ID detection circuitry completed, the telephone company proceeds to transmit the caller ID information. This technique of transmission of caller ID data using binary frequencies remains the same in almost all countries. As such, the main embodiment would apply in almost all the countries.

While caller ID protocols in most countries have a period of seizure signal (a repeating sequence of 010101 . . . ) in the startup, some countries like Japan have neglected to put this in their protocol. As mentioned before, the state counter circuit 70 continuously synchronize its resets to the symbol transitions of the incoming signal. Hence, the seizure signal becomes useful in this invention since the synchronization will occur during the seizure signal where zero-one and one-zero transitions occur throughout the period. This seizure signal allows timing recovery to be performed and reduces the chances of a timing error during the transmission of the actual caller ID data. In the event where the startup lacks the seizure signal, the state counter circuit 70 will synchronize to the first start bit, 0 bit, in the data stream, and continue to fine tune the synchronization whenever a zero-one or one-zero transition occurs. Thus, the capability of the invention is not limited by the protocols surrounding the FSK modulation, but is especially well-suited towards communication protocols which have a seizure signal to enhance its detection performance, such as the caller ID standard in the United States.

The preferred embodiment of the present invention, a binary non-coherent frequency shift keying detection scheme for capturing caller-id information, is described. While the present invention has been described in a particular embodiment, it should be appreciated that the present invention should not be construed as limited by such embodiments, but rather construed according to the claims below.

What is claimed is:

1. A capture circuit for receiving an incoming data signal utilizing frequency shift keying (FSK), comprising:
   a caller ID detector circuit coupled to receive an incoming telephone call containing an analog FSK caller ID data signal, detect transmission of said caller ID data signal, and pass information in said incoming analog FSK caller ID data signal inherent within said incoming telephone call through as an output;
   a zero crossing detector circuit that receives a FSK sampled signal and outputs a FSK zero crossing event signal;
   a zero crossing counter circuit coupled to said zero crossing detector circuit, wherein said zero crossing counter circuit measures a period between FSK zero crossing event signals and outputs a zero crossing time signal, which is indicative of a value of said data signal;
   a state variable circuit coupled to said zero crossing counter circuit and said zero crossing detector circuit, for outputting data equivalent to said information in said incoming analog FSK caller ID data signal inherent within said incoming telephone call; and
   a state counter circuit coupled to said state variable circuit that performs a self alignment to ensure that the sampling of the output of said state variable circuit occurs in a proximate middle of the baud.

2. A capture circuit as described in claim 1 further comprising a threshold detector circuit coupled to said caller ID detector circuit to rectify said incoming analog FSK caller ID data signal thus providing a rectified FSK caller ID data signal.

3. A capture circuit as described in claim 2 wherein said analog FSK caller ID data signal conforms to the V.23 standard.

4. A capture circuit as described in claim 2 wherein said analog FSK caller ID data signal conforms to the Bell 202 standard.

5. A capture circuit as described in claim 2 further comprising a sampling circuit coupled to said threshold detector circuit, wherein said sampling circuit receives and samples said rectified FSK caller ID data signal and provides a binary FSK caller ID sampled signal.

6. A capture circuit as described in claim 5 wherein said state counter circuit includes a timing reference and said output from said state variable circuit comprises a transition having an edge, and wherein further said state counter circuit adjusts an internal clock cycle in response to inputs from said state variable circuit to achieve realignment of said state counter circuit's timing reference to an edge of the transition output by said state variable circuit.

7. A capture circuit as described in claim 6 wherein said state variable circuit is coupled to a random access memory (RAM) array for receipt and storage of binary bits output by said state variable circuit.

8. A capture circuit as described in claim 1, wherein said state counter circuit includes a timing reference and said output from said state variable circuit comprises a transition having an edge and wherein further said state counter circuit adjusts an internal clock cycle in response to inputs from said state variable circuit to achieve realignment of said state counter circuit's timing reference to an edge of the transition output by said state variable circuit.

9. A capture circuit as described in claim 8 wherein said state variable circuit is coupled to a random access memory (RAM) array for receipt and storage of said data output by said state variable circuit.

10. A method using a capture circuit for receiving and decoding an incoming frequency shift keying (FSK) data signal, comprising the steps of:
   receiving a FSK sampled signal;
   outputting FSK zero crossing event signals;
   measuring a period between said FSK zero crossing event signals;
   generating a decoded signal indicative of value of said FSK data signal; and
   performing a self alignment to ensure that the sampling of said decoded signal corresponds to the middle of the baud;
   detecting the presence of caller ID signal;
   receiving an incoming analog caller ID FSK symbol;
   initiating operation of said capture circuit;

passing information in an incoming analog FSK caller ID data signal inherent within incoming telephone call through as an output.

11. The method of claim 10 further comprising the step of rectifying said incoming analog FSK caller ID data signal.

12. The method of claim 11 further comprising the step of sampling said rectified analog FSK caller ID data signal.

13. The method of claim 12 further comprising the step of outputting decoded binary bits equivalent to information contained within said analog FSK caller ID data signal.

14. The method of claim 13 further comprising the step of adjusting an internal clock cycle in response to inputs from a state variable circuit to achieve realignment of a timing reference to an edge of a state transition output.

15. A caller ID capture circuit utilizing frequency shift keying (FSK) principles for receiving and decoding an incoming caller ID data signal for use by a computer comprising:
- a caller ID detector circuit coupled to receive an incoming telephone call, detect presence of caller ID signal therefrom and thereupon initiate operation of said caller ID capture circuit and further to pass on information from an incoming analog FSK caller ID data signal inherent within said incoming telephone call through as an output;
- a zero crossing detector circuit that receives a binary FSK caller ID sampled signal and outputs a FSK zero crossing event signal;
- a zero crossing counter circuit coupled to said zero crossing detector circuit, wherein said zero crossing counter circuit measures the period between said FSK zero crossing event signals and outputs a zero crossing signal indicative of the binary value of said caller ID data signal;
- a state variable circuit coupled to said zero crossing counter circuit and said zero crossing detector circuit, for outputting binary data equivalent to said information contained within said analog FSK caller ID data signal; and
- a state counter circuit that automatically performs a self alignment to ensure that the sampling of output of said state variable circuit occurs in the middle of each cycle, wherein said state variable circuit utilizes a frequency period threshold to automatically accommodate multiple industry standard modem data transmission protocols based on frequency shift keying and wherein said analog FSK caller ID data signal complies with either of the V.23 standard or the Bell 202 standards.

16. A caller ID capture circuit utilizing frequency shift keying (FSK) principles for receiving and decoding an incoming caller ID data signal for use by a computer comprising:
- a zero crossing detector circuit that receives a binary FSK caller ID sampled signal and outputs a FSK zero crossing event signal;
- a zero crossing counter circuit coupled to said zero crossing detector circuit, wherein said zero crossing counter circuit measures the period between said FSK zero crossing event signals and outputs a zero crossing signal indicative of the binary value of said caller ID data signal;
- a state variable circuit coupled to said zero crossing counter circuit and said zero crossing detector circuit, for outputting binary data equivalent to information contained within said incoming caller ID data signal;
- a state counter circuit that automatically performs a self alignment to ensure that the sampling of output of said state variable circuit occurs in the middle of each cycle, wherein said state variable circuit utilizes a frequency period threshold to automatically accommodate multiple industry standard modem data transmission protocols based on frequency shift keying and wherein said incoming caller ID data signal complies with either of the V.23 standard or the Bell 202 standards;
- a caller ID detector circuit coupled to receive an incoming telephone call including an incoming analog FSK caller ID data signal; and
- a threshold detector circuit coupled to said caller ID detector circuit and wherein said threshold level detector circuit rectifies said incoming analog FSK caller ID data signal thus providing a rectified FSK caller ID data signal.

17. A caller ID capture circuit utilizing frequency shift keying (FSK) principles for receiving and decoding an incoming caller ID data signal for use by a computer comprising:
- a caller ID detector circuit coupled to receive an incoming telephone call including an incoming analog FSK caller ID data signal;
- a threshold detector circuit coupled to said caller ID detector circuit and wherein said threshold detector circuit rectifies said incoming analog FSK caller ID data signal thus providing a rectified FSK caller ID data signal;
- a sampling circuit coupled to said threshold detector circuit wherein said sampling circuit receives and samples said rectified FSK caller ID data signal and thereupon provides a binary FSK caller ID sampled signal;
- a zero crossing detector circuit that receives said binary FSK caller ID sampled signal and outputs a FSK zero crossing event signal;
- a zero crossing counter circuit coupled to said zero crossing detector circuit, wherein said zero crossing counter circuit measures the period between said FSK zero crossing event signals and outputs a zero crossing time signal indicative of the binary value of said caller ID data signal;
- a state variable circuit coupled to said zero crossing counter circuit and said zero crossing detector circuit, for outputting binary data equivalent to information contained within said analog FSK caller ID data signal; and
- a state counter circuit that automatically performs a self alignment to ensure that the sampling of output of said state variable circuit occurs in the middle of each cycle, wherein said state variable circuit utilizes a frequency period threshold to automatically accommodate multiple industry standard modem data transmission protocols based on frequency shift keying and wherein said analog FSK caller ID data signal complies with either of the V.23 standard or the Bell 202 standards.

18. A caller ID capture circuit as described in claim 17 wherein said state counter circuit includes a timing reference and said output from said state variable circuit comprises a transition having an edge and said state counter circuit adjusts an internal clock cycle in response to inputs from said state variable circuit to achieve realignment of said state counter circuit's timing reference to the edge of the state transition output by said state variable circuit.

19. A caller ID capture circuit as described in claim 18 wherin said state variable circuit is coupled to a random access memory (RAM) array for receipt and storage of binary bits output by said state variable circuit and for use by said computer.

* * * * *